United States Patent [19]

Goodacre

[11] 4,195,858
[45] Apr. 1, 1980

[54] STEERING LINKAGES AND VEHICLES INCORPORATING THEM

[75] Inventor: Stephen P. Goodacre, Basingstoke, England

[73] Assignee: Lansing Bagnall Limited, Hampshire, England

[21] Appl. No.: 961,854

[22] Filed: Nov. 17, 1978

[30] Foreign Application Priority Data

Nov. 25, 1977 [GB] United Kingdom ............... 49249/77

[51] Int. Cl.$^2$ .............................................. B62D 3/02
[52] U.S. Cl. ..................................... 280/95 R; 280/96
[58] Field of Search ...................... 280/95 R, 95 A, 96, 280/96.1, 93, 94; 180/79, 151, 79.3

[56] References Cited

U.S. PATENT DOCUMENTS

| 3,021,150 | 2/1962 | Ulinski | 280/95 R |
| 3,059,944 | 10/1962 | Goodacre | 280/95 R |
| 4,013,301 | 3/1977 | Gaskin | 280/95 R |

Primary Examiner—Philip Goodman
Attorney, Agent, or Firm—Cushman, Darby & Cushman

[57] ABSTRACT

A steering linkage for a pair of wheels with upright pivot axes is comprised of links and pivots. Torque can be applied to each wheel via a pivotal connection to an intermediate link when control links are pivoted about their fixed pivots by a drive applied through a tiebar. Each wheel can be rotated about its pivot axis by at least 180°, and the turning circles of the wheels have a common center which, when the wheels are steered describes a line parallel to the line which joins the pivot axes of the wheels. In a four wheeled vehicle the described line is coincident with the rotational axes of the second set of wheels.

14 Claims, 8 Drawing Figures

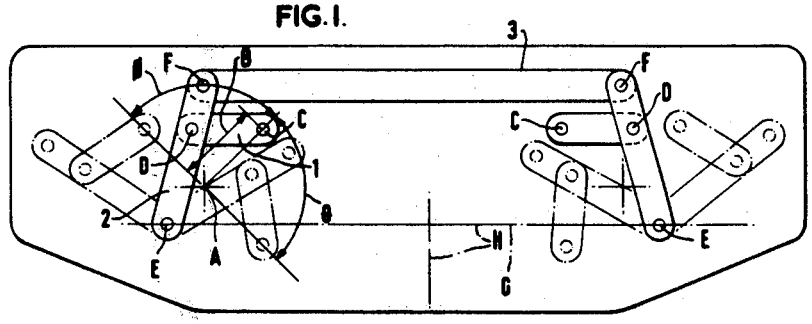
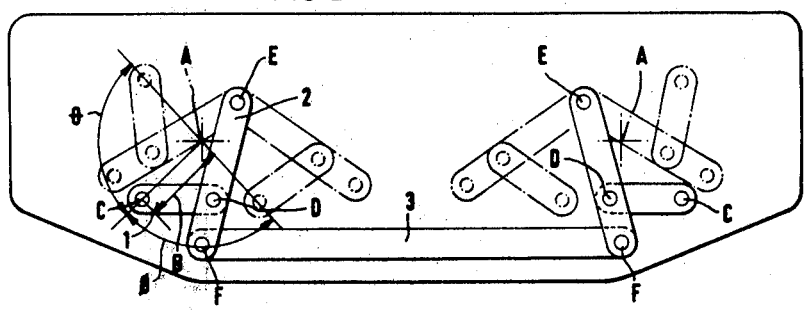
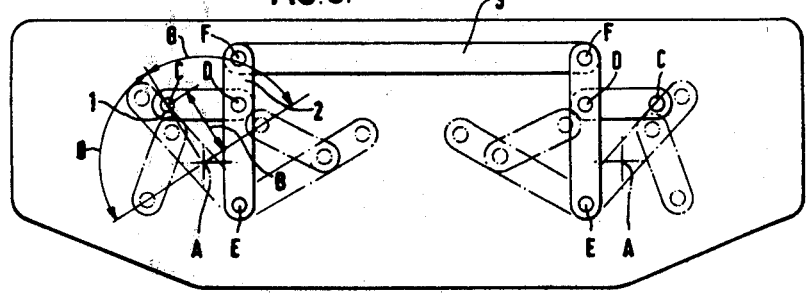

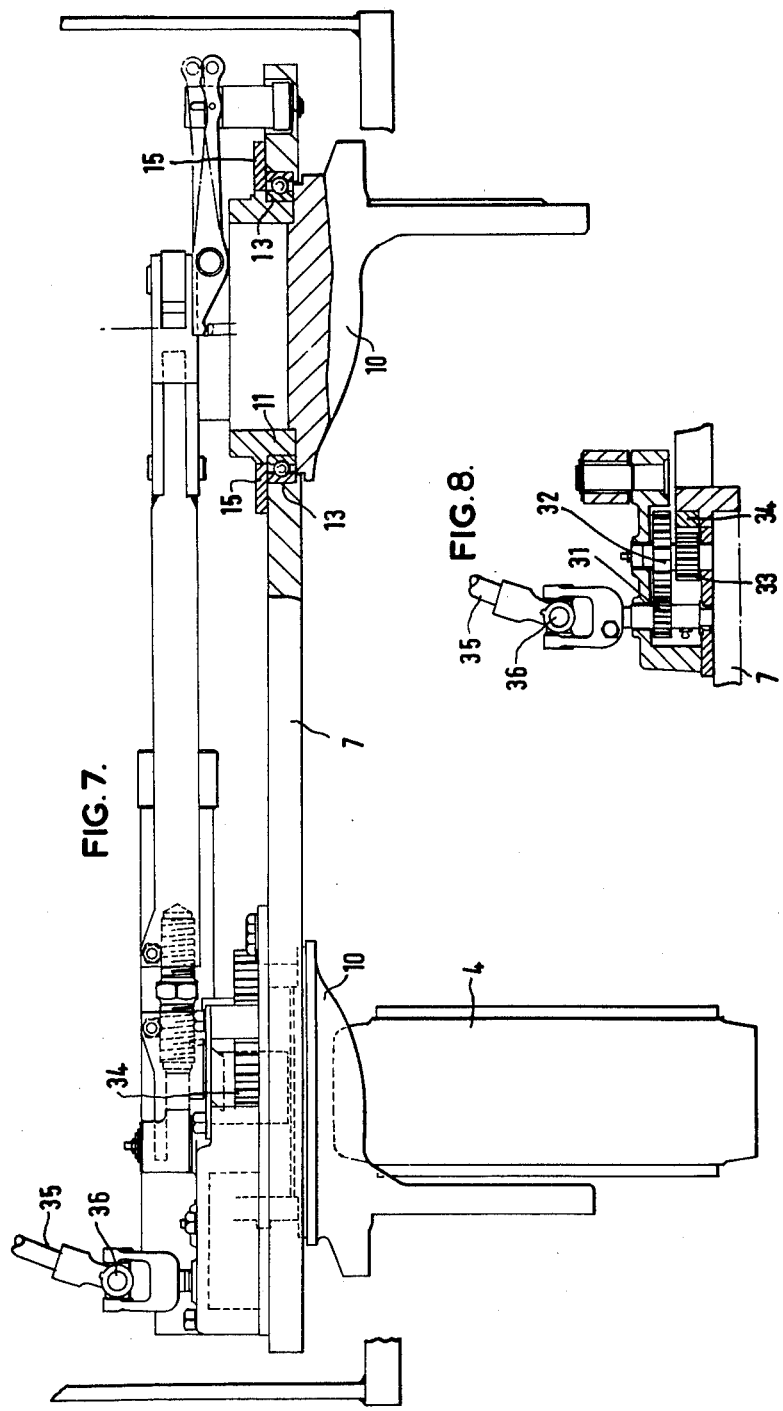

STEERING LINKAGES AND VEHICLES INCORPORATING THEM

FIELD OF THE INVENTION

This invention relates to steering linkages by which a pair of wheels can be linked for differential steering movements through an angle of lock of at least 180°.

SUMMARY OF THE INVENTION

The invention provides a steering linkage for a pair of wheels which have upright pivot axes, comprising, for each wheel, a member which is disposed to rotate with the wheel and is pivotally connected to one end of an intermediate link at a point spaced from the respective pivot axis, a control link which at one end is pivoted about a fixed axis and has a pivotal connection to the other end of the respective intermediate link, the distance between the fixed axis and the connection between the control line and the intermediate link being greater than the distance between the pivot axis and the pivotal connection between the said member and the intermediate link, and a means which connects the said control links, the arrangement being such that when the wheels are parallel, the said links are substantially symmetrical about the bisector of a notional line joining the pivot axes of the wheels and each wheel can be rotated for at least 180° about its respective pivot axis, and such that the turning circles of the wheels have a common centre which lies on a notional line parallel to the said notional line that joins the pivot axes of the wheels and for each steering movement of the wheels away from parallelism moves along its notional line and at least reaches the said bisector.

BRIEF DESCRIPTION OF THE DRAWINGS

FIGS. 1 to 4 illustrate diagrammatically various configurations of the primary elements of a steering linkage according to the invention;

FIGS. 6 to 8 are scale drawings of a particular embodiment of the invention.

DESCRIPTION OF THE PREFERRED EMBODIMENTS

Figure 4:
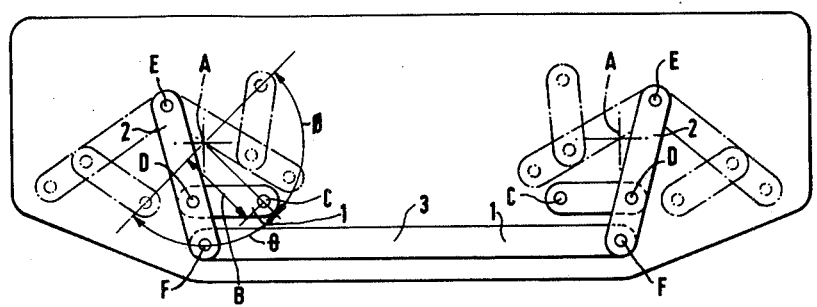

In FIG. 1, the reference A denotes, for each wheel, a respective upright axis about which the wheel pivots to provide steering. The wheel is to be rotated by or with the aid of a rigid member to which torque is applied through a pivot point C which is spaced from the respective pivot axis A by a distance B. The distance B depends upon the steering torque that the vehicle, which may be an industrial truck, needs and the space available. It will be appreciated that the connection of a link between the points C will not enable the transmission of torque from one wheel to another through an angle of 180° of steering.

For each wheel there is a long link 2, hereinafter called control link, which is pivoted about a fixed axis E. In the embodiment shown in FIG. 1, the separation between the fixed axes E is greater than the separation between the pivot axes A, and a line G joining the axes E is parallel to a line joining the pivot axes A. An intermediate link 1 connects the pivot point C to a pivot point D on the respective control link 2. The distance from E to D must be greater than the dimension B between A and C. Then if the pivot C sweeps through an arc subtending at A an angle of 180°, the free end of the long link will sweep through an arc of similar length which however will subtend at E an angle of less than 180°. The intermediate link 1 is required to provide transmission of torque between the control link 2 and the member, not explicitly shown in FIG. 1, which connects the pivot C to the wheel which pivots about the axis A.

This member, the intermediate link and the control link will pivot a wheel through an angle of 180° by the action of torque on the control link for most configurations of the member, intermediate link and control link.

The two control links are preferably joined by a tie-bar 3. The distances between the respective pivot point F of the tiebar on the control link and the respective fixed pivot E should be equal but may be varied as desired.

The linkage should have symmetry about the bisector H of the line G when the wheels are substantially parallel and provide a steering track along or parallel to this bisector. In this symmetrical position, the tiebar 3 lies parallel to the lines joining the axes A and the axes E respectively.

If the linkage shown in FIG. 1 is moved, from that position, one or other of the pivots C (depending on the sense of the movement) will move conjointly with its associated wheel, through an angle of less than 90° and the other pivot C will move with its wheel through an angle of more than 90° to a position in which the rotary axes of the wheels intersect at a point which lies on the bisector H. For all intermediate positions, the intersection of the rotary axes of the wheels will lie elsewhere on a line parallel to the notional line joining the pivot axes of the wheels. Preferably, in a four-wheeled vehicle, the line on which the intersection of the rotary axes of the wheels lies lies on the colinear rotary axes of the other two wheels.

FIG. 2 illustrates a modification in which the connecting link 3 is longer than, and the distance between the fixed pivots E is shorter than, the distance between the wheels' pivot axes A.

FIG. 3 illustrates another modification, in which the control links are inside the wheel centres A. It also differs from the arrangements shown in FIGS. 1 and 2 in that in the symmetrical position of the linkage, the control links are parallel. If this condition is satisfied, the link between the control links may be a gear train a chain and sprocket linkage or any other suitable form of direct linkage.

FIG. 4 illustrates another embodiment which is the reverse of the embodiment shown in FIG. 1.

Figure 5:
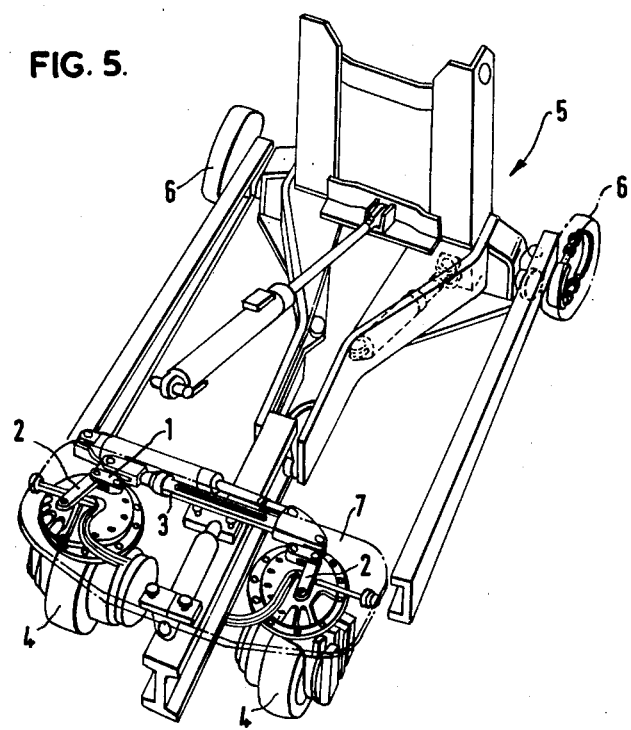
FIG. 5 is a perspective view of part of the chassis of an industrial truck, incorporating one embodiment of the invention.

FIG. 5 is a simplified perspective drawing of part of the chassis of an industrial truck which incorporates an embodiment similar to that shown in FIG. 1 of the drawings. The linkage described with reference to FIG. 1 is provided in the embodiment shown in FIG. 5 to provide correct tracking for two driving wheels 4 each of which incorporates a motor. These wheels are disposed at one end of a chassis 5 which at its other end carries two fixed wheels 6.

Figure 6:
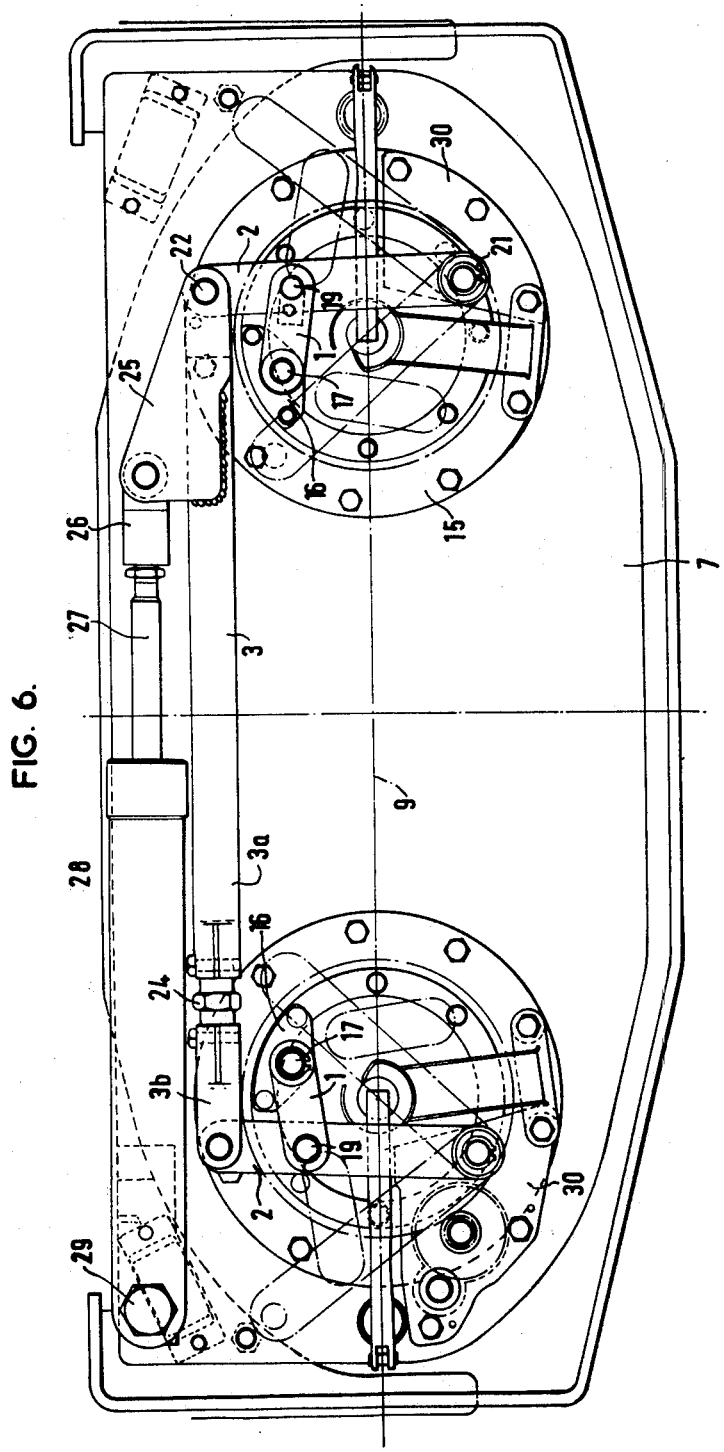

FIGS. 6 and 7 illustrate a plan view and an end elevation view partly in section, respectively of the linkage and various parts associated with it. The wheels are each carried by a respective one of two brackets 10, each of which has an axially extending upper annular flange 11 which protrudes through a circular aperture in a base plate 7. A bearing 13 is provided between the flange and the base plate 7. The bearings for each of the flanges are held in position by a respective annular plate 15 which is bolted to the base plate 7 and encircles the flange 11. A respective bracket 16 is secured to the upper rim of each flange 11. Each bracket 16 includes a pivot pin 17, corresponding to the pivot C in FIG. 1. This pivot pin will, as the respective wheel executes a steering movement, rotate in a circle about the upright axis A about which the respective wheel pivots. A respective intermediate link 1 is connected at one end to the pivot pin 17 and at its other end to a pivot pin 19, corresponding to the pivot D, which is disposed between the ends of a respective control link 2. Each control link 2 is mounted at one end for rotation about a respective fixed pivot 21 mounted on a bracket 30 secured to the plate 15, pivot 21 corresponding to the pivot E in FIG. 1. At its other end, each control link is pivoted at 22, corresponding to the point F, to a respective end of a connecting link 3. This connecting link may be adjustable by means of an intermediate threaded connecting piece 24 which threadingly engages the two parts 3a and 3b of the link 3. In this embodiment the link 3 carries a bracket 25 connected to the outer end of the piston rod 27 of a hydraulic jack of which the cylinder 28 is mounted on a fixed pivot 29 secured to the base plate 7.

The steering movements of the wheels can be effected in at least two ways. As is shown in FIGS. 6 and 7, the hydraulic jack 28 may pull and push the connecting link 3 according to the desired direction of turn of the wheels. Alternatively or additionally, the flange on one of the wheel brackets may be rotated through a system of gears 31, 32, 33 and 34 operated by a steering column 35 linked to the gears by means of a universal joint 36 as shown in FIG. 8.

I claim:

1. A steering linkage for a pair of wheels which have upright pivot axes, comprising, for each wheel:
    a member which is disposed to rotate with the wheel;
    an intermediate link one end of which is pivotally connected to said member at a point spaced from the respective pivot axis;
    a control link which at one end is pivoted about a fixed axis and has a pivotal connection to the other end of the respective intermediate link, the distance between the fixed axis and the connection between the control link and the intermediate link being greater than the distance between the pivot axis and the pivotal connection between the said member and the intermediate link;
    and a means which connects the said control links, the arrangement being such that when the wheels are parallel, the said links are substantially symmetrical about the bisector of a notional line joining the pivot axes of the wheels and each wheel can be rotated for at least 180° about its respective pivot axis, and such that the turning circles of the wheels have a common centre which lies on a notional line parallel to the said notional line that joins the pivot axes of the wheels and for each steering movement of the wheels away from parallelism moves along its notional line and at least reaches the said bisector.

2. A steering linkage according to claim 1 wherein the distance between the fixed axes of the control links is greater than the distance between the pivot axes of the wheels.

3. A steering linkage according to claim 2 wherein the distance between the pivotal connections of the control links to the intermediate link is less than the distance between the fixed axes of the control links when the wheels are parallel.

4. A steering linkage according to claim 1 wherein the distance between the fixed axes of the control link is equal to the distance between the pivtoal connections of the control links to the intermediate links when the wheels are parallel.

5. A steering linkage according to claim 1 wherein the distance between the fixed axes of the control links is less than the distance between the pivot axes of the wheels.

6. A steering linkage according to claim 5 wherein the distance between the pivotal connections of the control links to the intermediate links is greater than the distance between the fixed axes of the control links when the wheels are parallel.

7. A steering linkage according to claim 1 wherein the wheel pivot axes are disposed between the control links when the wheels are parallel.

8. A steering linkage according to claim 1 wherein the control links are disposed between the wheel pivot axes when the wheels are parallel.

9. A steering linkage according to claim 1 wherein the intermediate links are disposed on the same side of the control links as the wheel pivot axes when the wheels are parallel.

10. A steering linkage according to claim 1 wherein said connecting means between the control links is a tiebar pivotally connected to the control links and the respective distances on the control links between the pivotal connections to the tiebar and the fixed axes of the control links is equal.

11. A steering linkage according to claim 10 wherein the bar is adjustable in length.

12. A steering linkage according to claim 11, in which a hydraulic jack is disposed to shift the tiebar to rotate the wheels.

13. A steering linkage according to claim 1, a second set of wheels and a common chassis on which both pairs of wheels are mounted, in which the notional line parallel to said notional line which joins the pivot axes of the wheels is a line joining the rotational axes of the second set of wheels.

14. An industrial truck incorporating a steering linkage according to claim 1.

* * * * *